United States Patent [19]
Beckers

[11] 3,898,195
[45] Aug. 5, 1975

[54] STABILIZED METHYLENE CHLORIDE COMPOSITION
[75] Inventor: Norman L. Beckers, Humble, Tex.
[73] Assignee: Diamond Shamrock Corporation, Cleveland, Ohio
[22] Filed: May 13, 1974
[21] Appl. No.: 469,333

Related U.S. Application Data
[63] Continuation-in-part of Ser. No. 335,002, Feb. 23, 1973, abandoned, and a continuation-in-part of Ser. No. 335,003, Feb. 23, 1973, abandoned.

[52] U.S. Cl. .......................................... 260/652.5 R
[51] Int. Cl. ............................................ C07c 17/40
[58] Field of Search ............................ 260/652.5 R

[56]  References Cited
UNITED STATES PATENTS
1,904,450  4/1933  Harris ......................... 260/652.5 R
2,981,759  1/1961  Cole, Jr. et al. ............. 260/652.5 R Primary Examiner—D. Horwitz
Attorney, Agent, or Firm—William A. Skinner

[57]  ABSTRACT

Methylene chloride stabilized by admixture with diisopropylamine, N-methyl pyrrole, butylene oxide, propylene oxide, methyl acetate, acetone, tertiary amylenes, and methyl alcohol. The composition is useful in metal degreasing.

2 Claims, No Drawings

STABILIZED METHYLENE CHLORIDE COMPOSITION

CROSS REFERENCE TO RELATED APPLICATIONS

This is a continuation-in-part of copending applications Ser. No. 335,002 and Ser. No. 335,003, both filed Feb. 23, 1973 and now abandoned.

BACKGROUND OF THE INVENTION

Methylene chloride is a highly versatile and useful solvent for various industrial applications at both normal and elevated temperatures. A particularly important industrial use is the vapor degreasing of metals. Methylene chloride is known to be more stable than other chlorinated hydrocarbon solvents such as perchloroethylene, trichloroethylene and methyl chloroform when the solvents are used in unstabilized condition. For example, methylene chloride is more resistant to oxidation, hydrolysis and pyrolysis than other chlorinated solvents and does not substantially react with aluminum in the aluminum scratch test commonly used to indicate unstabilized or minimally stabilized methyl chloroform. In addition, methylene chloride may be used to greater advantage in vapor degreasing of metals than other known degreasing solvents since it may be used effectively at lower temperatures due to its lower boiling point and excellent stability. Methylene chloride is particularly desirable for such degreasing operations since it is substantially resistant to photochemical activity and therefore does not contribute to air pollution by smog formation.

However, methylene chloride when used in various metal cleaning functions, including vapor degreasing, suffers the disadvantage of being reactive with aromatic and aliphatic organic compounds in the presence of metals, metal halides and combinations thereof. The reaction produces hydrochloric acid and objectionable high boiling tarry substances which render the methylene chloride unsuitable for further use. The entire reaction of methylene chloride in the presence of aromatic compounds is not completely understoood but is believed to be a condensation reaction catalyzed by metal, metal halides or combinations thereof. Likewise, the aliphatic compound reaction is believed to be catalyzed, or initiated and catalyzed by the presence of metals such as aluminum, zinc, iron and the like, halides of said metals and combinations of said metals and halides.

Aromatic and aliphatic organic compounds of this reactive nature and metals such as aluminum, iron and zinc, their halides and combinations are generally introduced into the methylene chloride from various cutting oils and lubricants used in metal fabricating operations which are carried over into the methylene chloride solvent during vapor degreasing or other cleaning of the fabricated metal parts. Solvent manufacturing, handling and storage equipment is another source for introduction of such impurities. To prevent degradation and other types of deterioration such as oxidation, hydrolysis and pyrolysis which may occur in some instances, it has been the practice to incorporate minor quantities of various organic compounds into methylene chloride, which compounds act as stabilizers to substantially prevent such degradation. It is desirable to provide methylene chloride stabilized to effectively prevent degradation in various applications, and the demand still exists for a low cost stabilized methylene chloride composition that can be easily prepared and which provides optimum stabilization under many different operating conditions.

SUMMARY OF THE INVENTION

An object of this invention is to provide a stabilized methylene chloride composition which does not deteriorate or degrade when in association with metals, metal halides and combinations including aluminum, iron and zinc, halides of said metals and combinations, and aromatic or aliphatic compounds.

A further object of this invention is to provide a stabilized methylene chloride composition in which the stabilizers are low in cost and capable of being incorporated with ease into the methylene chloride.

Still another object of this invention is to provide a process for the degreasing of metals by contacting the metals with methylene chloride stabilized to prevent degradation of the methylene chloride in the presence of impurities such as reactive aromatic and aliphatic compounds and metals, halides of said metals and combinations of the individual metals and salts thereof.

These and additional objects of the present invention will become apparent to those skilled in the art from the description and claims which follow.

DESCRIPTION OF THE PREFERRED EMBODIMENTS

The objects set forth above have been found to be attained by providing a stabilized composition consisting essentially of methylene chloride containing from about 0.001 to about 2.0 percent by weight of the methylene chloride of each of diisopropylamine, N-methyl pyrrole, butylene oxide, propylene oxide, methyl acetate, acetone, tertiary amylenes and methyl alcohol.

The quantity of the stabilizing agents useful in the practice of this invention will vary depending upon the conditions of use, the identity and quantity of other stabilizers incorporated into the methylene chloride and other practical operating considerations. Each stabilizing agent or compound may generally be used within the range of from about 0.001 to about 2.0 percent and preferably from about 0.002 to 1.0 percent by weight of the methylene chloride. Although higher concentrations may be used, if desired, no additional benefit is obtained and the cost is unnecessarily increased. While the above composition containing stabilizing agents provides optimum prevention of degradation of the methylene chloride under a variety of operating conditions it is also possible to stabilize methylene chloride by deleting the methyl alcohol depending on the stabilization required for the particular operating condition.

The stabilized composition may be used for the degreasing of metals by contacting the metals with the stabilized composition. Thus, the process for vapor degreasing metals comprises contacting the metals to be degreased with the above described stabilized methylene chloride compositions wherein the methylene chloride contains an admixture of stabilizing amounts of diisopropylamine, N-methyl pyrrole, butylene oxide, propylene oxide, methyl acetate, acetone, tertiary amylene and methyl alcohol.

In degreasing metals with the above described preferred stabilized methylene chloride, the presence of aromatic or aliphatic organic compounds and metals, metal halides and combinations thereof will not cause degradation of the methylene chloride. The presence of reactive aromatic organic compounds such as toluene, mesitylene, napthalene, durene and the like, as well as aliphatic compounds such as trans-dichloroethylene, carbon tetrachloride, 1,1,1-trichloroethane and the like, is usually attributed to the use of cutting oils and lubricants during metal fabrication operations and to contamination during solvent manufacturing, handling and storage. The presence of metals including aluminum, iron, zinc, halides of such metals and combinations thereof is usually attributed to fabricating operations such as stamping, drilling, or machining. Degradation of methylene chloride during degreasing operations where reactive organic compounds and metals are present is effectively inhibited by admixing with the methylene chloride from 0.001 to 2.0 percent by weight of each of diisopropylamine, N-methyl pyrrole, butylene oxide, propylene oxide, methyl acetate, acetone, tertiary amylenes and methyl alcohol.

In order that those skilled in the art may readily understand the present invention and certain specific embodiments by which it may be carried into effect, the following illustrative examples are presented.

In Examples 1 to 8 of Table I below, aluminum reflux stability tests were carried out by placing 190–200 ml of substantially water free methylene chloride in a 300 ml flask, adding about 1.0 grams of 20 mesh granular aluminum and suspending a bright aluminum coupon about 2 × 7 cm in a condenser fitted to the flask. Methylene chloride containing 5 percent by volume of various organic compounds and methylene chloride with the stabilizing composition of this invention plus 5 percent by volume of organic compounds were refluxed for varying time periods. During the extended period of reflux the solvent vapor surrounded, condensed, and dripped from the suspended strip. In all cases the pH was determined after the system was refluxed for the varying time periods noted and visual observations of the aluminum condenser coupon were made. The results of the various tests are shown in Table I below.

TABLE I

EFFECT OF ORGANIC COMPOUNDS ON ALUMINUM REFLUX STABILITY TESTS WITH METHYLENE CHLORIDE

| Example No. | Solvent System | Volume, Additive | Days Test | pH | Color Solvent | Condenser Coupon Corrosion |
|---|---|---|---|---|---|---|
| 1 | Methylene Chloride | 0 | 3 | 7.0 | Clear and Colorless | Blisters |
| 2 | Methylene Chloride | 5% Mesitylene | 5 | <3 | Orange-Black, HCl fumes | Generally Severe |
| 3 | Methylene Chloride plus Aluminum Coupon, Stabilized with 0.0025 Wt.% Diisopropylamine 0.005 Wt.% N-methyl pyrrole 0.25 Wt.% Propylene Oxide 0.125 Wt.% Butylene Oxide 0.20 Wt.% Methyl Acetate 0.05 Wt.% Acetone 0.25 Wt.% Tert. Amylenes 0.05 Wt.% Methyl Alcohol | 5% Mesitylene | 35 | 8.1 | Clear and Colorless | None |
| 4 | Methylene Chloride | 5% Durene | 6 | 5.4 | Yellow, turbid | Generally Severe |
| 5 | Methylene Chloride | 5% 1,1,1-Trichloroethane | ⅓ | <3 | Black HCl fumes | Severe |
| 6 | Methylene Chloride plus Aluminum Coupon, Stabilized with system of Example 3 | 5% 1,1,1-Trichloroethane | 15 | 8.5 | Clear and Colorless | None |
| 7 | Same as Example 6 with addition of about 0.04 g. anhydrous AlCl₃ and one additional day of reflux | 5% 1,1,1-Trichloroethane | 16 | 8.2 | Clear and Colorless | None |
| 8 | Same as Example 7 with addition of about 0.04 g. anhydrous FeCl₃ and seven additional days of reflux | 5% 1,1,1-Trichloroethane | 23 | 7.3 | Clear and yellow | None |

The tests in Table I were conducted by venting the condenser to room air and without the addition of water. Also in Table I the pH determinations were made with a portion of the water layer obtained by extraction of the solvent with water equal to the volume of the solvent system.

Table I illustrates the prevention of degradation of methylene chloride by the stabilizing components of this invention in the presence of aluminum and the aromatic compound mesitylene (trimethyl benzene) in Example 3. Examples 2 and 4 show degradation of methylene chloride in the presence of the aromatic compounds mesitylene and durene (tetramethyl benzene) when refluxed with aluminum in the absence of the stabilizing composition of this invention.

In Example 5 deterioration of the solvent system occurred due to the reaction of aluminum with the contained 1,1,1-trichloroethane. In Example 6 the addition of the stabilizing composition of this invention to this solvent system prevented such deterioration and in Example 7 even after about 0.04 grams anhydrous aluminum chloride was added and the system refluxed an additional day. In Example 8 even with the further addition of about 0.04 grams anhydrous ferric chloride and an additional seven days of refluxing no corrosion of the aluminum in the flask or the condenser was observed.

In Table II hydrolytic stability tests were made by placing 150 ml of partially stabilized methylene chloride in Example 9 and 150 ml of methylene chloride containing the stabilizing composition specified in Example 10 into a 300 ml boiling flask. The flask was fitted with a soxhlet extractor equipped with a syphon break and a condenser vented to room air. Fifty milliliters of the solvent of each Example were first introduced into the Soxhlet and 50 ml of water was then added. One gram of 20 mesh granular aluminum, about one gram of 30 mesh granular zinc and about 0.1 g of iron powder were placed in the flask. A 2 × 7 cm. zinc coupon of known weight was positioned in the Soxhlet and a 2 × 7 cm weighed steel coupon was mounted in the condenser. The contents of the flask were refluxed for the period of time specified by heating the boiling flask with an electric heater. At the end of the reflux period the pH and alkalinity, as NaOH, of the solvent contents of the Soxhlet and of the flask were determined from a portion of the aqueous phase obtained by extraction of the solvent with an equal volume of neutral distilled water after the solvent system had been refluxed for the time specified. The zinc and iron coupons were cleaned of any accumulated corrosion products, weighed and the difference in initial and final weight recorded as weight loss.

The results are shown below in Table II.

TABLE II

| Example No. | Stabilized Solvent System | Days Test | pH Flask | pH Sox. | Alk. as ppm. NaOH Flask | Alk. as ppm. NaOH Sox | Color of Solvent | Total mg. Loss Zn (Sox.) | Total mg. Loss Fe (Cond.) |
|---|---|---|---|---|---|---|---|---|---|
| 9 | Methylene Chloride plus 0.30 Wt.% Propylene Oxide 0.10 Wt.% Butylene Oxide 0.005 Wt.% Di-isopropylamine 0.005 Wt.% N-methyl pyrrole | 15 | 9.2 | 7.4 | 18 | 4.3 | Clear, gray | 36 | 140 |
| 10 | Methylene Chloride plus Aluminum Coupon Stabilized With 0.0025 Wt.% Diisopropylamine 0.005 Wt.% N-methyl pyrrole 0.25 Wt.% Propylene Oxide 0.125 Wt.% Butylene Oxide 0.20 Wt.% Methyl Acetate 0.05 Wt.% Acetone 0.25 Wt.% Tert. Amylenes 0.05 Wt.% Methyl Alcohol | 15 | 8.5 | 7.3 | 16 | 3.7 | Clear, gray | 28 | 54 |

The superiority of the stabilizing composition of this invention is evident from a comparison of the results of Example 10, the composition of the present invention, and Example 9, a stabilizing composition of known good stabilizing characteristics formulated by the applicant herein. Much less corrosion of the zinc coupon in the Soxhlet and the iron coupon located in the condenser occurred in the use of the composition of this invention during the 15 day reflux period.

In Examples 11 and 12 of Table III reflux stability tests were conducted by following Federal Specification 0-T-236b modified by the use of 200 ml of the solvent system in place of 100 ml and by positioning a 6-watt ultraviolet lamp about 1 inch from the vapor tube of the Soxhlet extractor. A 300 ml boiling flask was fitted with a Soxhlet extractor, a condenser connected to the extractor, about 1.0 gram of granular zinc and about 0.5 ml of water was added to the flask and a 2 × 7 cm zinc coupon was inserted in the extractor and the condenser. The condenser was vented to a water scrubber.

The results of the tests are presented in Table III.

TABLE III

REFLUX STABILITY TESTS WITH STABILIZED METHYLENE CHLORIDE

| Example No. | Stabilized Solvent System | Metal in Test | Days Test | pH | Color of Solvent | Mg. Zinc Loss Soxhlet | Mg. Zinc Loss Condenser |
|---|---|---|---|---|---|---|---|
| 11 | Methylene Chloride | Zn | 16 | 6.5 | Very | 11 | 59 |

TABLE III—Continued

REFLUX STABILITY TESTS WITH STABILIZED METHYLENE CHLORIDE

| Example No. | Stabilized Solvent System | Metal in Test | Days Test | pH | Color of Solvent | Mg. Zinc Loss Soxhlet | Condenser |
|---|---|---|---|---|---|---|---|
| | plus 0.30 Wt.% Propylene Oxide 0.10 Wt.% Butylene Oxide 0.005 Wt.% Di-isopropylamine 0.005 Wt.% N-methyl pyrrole | | | | Turbid | | |
| 12 | Methylene Chloride plus Aluminum Coupon, Stabilized with 0.0025 Wt.% Diisopropylamine 0.005 Wt.% N-methyl pyrrole 0.25 Wt.% Propylene Oxide 0.125 Wt.% Butylene Oxide 0.20 Wt.% Methyl Acetate 0.05 Wt.% Acetone 0.25 Wt.% Tert. Amylenes 0.05 Wt.% Methyl Alcohol | Zn | 16 | 6.7 | Turbid | 7.8 | 22 |

Storage stability tests of stabilized methylene chloride were carried out in Examples 13 to 15 of Table IV. About 250 ml of each of three stabilized methylene chloride compositions specified in the Examples was placed in a pint bottle containing three one-sixteenth inch diameter × 5 inch rusty steel rods and two ½ inch × 6 inch × 0.003 inch gauge rusty steel coupons. About 1.32 ml (0.04 wt. percent) of distilled water was added and the entire contents of the bottle thoroughly agitated at the start of the test period. In Example 13 an additional 0.4 wt. percent of water was added to the bottle after 1 day. The capped bottles were permitted to stand for 5 days after which visual observations of the steel coupons, the solvent and the surface of the solvent were made and recorded. The bottles were then uncapped and any detectable objectionable odor noted.

The results of the tests are included in Table IV.

The superiority of the composition of this invention in stabilizing methylene chloride on exposure to water and rusty steel storage conditions is evidenced by the results of Example 15 as compared to the results of the tests in Examples 13 and 14 in which two different stabilizing compositions known in the art were used. In Example 15 no uncharacteristic odor was detected but both Examples 13 and 14 had an objectionable putrid odor.

In Examples 16 and 17 respectively, of Table V, 15 ml of substantially water free methylene chloride and methylene chloride stabilized with the specified quantities of diisopropylamine, N-methyl pyrrole, propylene oxide, butylene oxide, methyl acetate, acetone, tertiary amylenes and methyl alcohol were placed in glass vials containing a 1 $cm^2$ aluminum coupon one sixty-fourth inch thick. The vials were tightly capped and allowed to stand at ambient conditions. After 16 hours no

TABLE IV

STABILITY STORAGE TESTS OF METHYLENE CHLORIDE

| Example No. | Stabilized Solvent System, Wt. % | Days Test | Color and Appearance After Test Period Solvent and Surface Condition | Steel Coupons |
|---|---|---|---|---|
| 13 | Methylene Chloride Containing 0.50 Propylene Oxide 0.10 Nitromethane 2.30 Dimethoxymethane | 5 | Clear, light yellow; water ring at surface | Slightly increased rusting |
| 14 | Methylene Chloride Containing 1.0 Nitromethane 2.3 1,4-Dioxane | 5 | Clear, yellow; yellow band and water ring at surface | Increased rust and blisters |
| 15 | Methylene Chloride Containing 0.0025 Diisopropylamine 0.0050 N-Methyl pyrrole 0.25 Propylene Oxide 0.125 Butylene Oxide 0.20 Methyl Acetate 0.05 Acetone 0.25 Tert. Amylenes 0.05 Methyl Alcohol | 5 | Clear and Colorless; water ring at surface | Slightly increased rust, blackened | changes had taken place in the appearance of the solvent, the pH or the aluminum in each vial. Toluene in an amount of 5 percent by volume and about 0.04 grams of anhydrous aluminum chloride were then added to each vial, the contents stirred, changes in the contents recorded, and the vials loosely capped and allowed to stand. After 4 hours and after 22, changes in the appearance of the aluminum coupons and the solvents, and relative pH values of the solvents, were recorded. The procedure of Examples 16 and 17 was followed in Examples 18 to 22 of Table V. In the latter Examples various compounds reported in the prior literature to be useful in stabilizing chlorinated solvents were evaluated for their ability to stabilize methylene chloride. In Examples 18 to 22 after the tightly capped vials had been standing for 16 hours no changes had occurred in the appearance of the solvent, the pH or the aluminum coupons and the toluene and AlCl$_3$ were added. The results of the tests of Examples 18 to 22 are set forth in Table I.

Table V show that various compounds frequently used as solvent stabilizers are not as effective as the stabilizing composition of this invention in inhibiting degradation of methylene chloride by reaction of aromatic compounds with methylene chloride in the presence of metals, metal salts, and combinations thereof.

Although the present invention has been described with detailed reference to specific embodiments thereof, it is not intended to be so limited since modifications and alterations may be made therein which are within the complete intended scope of this invention as defined by the appended claims.

What is claimed is:

1. A stabilized composition consisting essentially of methylene chloride and from about 0.001 to about 2.0 percent by weight of each of diisopropylamine, N-methyl pyrrole, butylene oxide, propylene oxide, methyl acetate, acetone, tertiary amylenes, and methyl alcohol.

2. The composition of claim 1 wherein diisopropyl-

TABLE V

INHIBITION OF REACTION OF AROMATIC COMPOUNDS WITH METHYLENE CHLORIDE

| Example No. | Solvent System | Upon Addition of 5% Vol. Toluene and 0.04 grams Aluminum Chloride | After 4 hours | After 22 hours |
|---|---|---|---|---|
| 16 | Methylene Chloride Containing Aluminum Coupon | Light Yellow Precipitate | Dark Orange pH <3 HCl fumes | No Change |
| 17 | Methylene Chloride Containing Aluminum Coupon, Stabilized With 0.0025 Wt.% Diisopropylamine 0.005 Wt.% N-methyl pyrrole 0.25 Wt.% Propylene Oxide 0.125 Wt.% Butylene Oxide 0.20 Wt.% Methyl Acetate 0.05 Wt.% Acetone 0.25 Wt.% Tert.Amylenes 0.05 Wt.% Methyl Alcohol | Solution Colorless Yellow-White Precipitate | White Precipitate Colorless pH about 8.5 | No Change |
| 18 | Methyl Chloride Containing Aluminum Coupon, Stabilized with 2.8 Wt.% Dimethoxymethane | Solution light brown Purple Precipitate Turned purple-brown after a few minutes | Solution light gray-tan Brown spots on aluminum coupon Grey-white precipitate pH <3 | No Change |
| 19 | Methylene Chloride Containing Aluminum Coupon, Stabilized With 0.7 Wt.% Methyl Butynol | Solution Dark Purple Colored | Solution Purple-Black and Precipitate pH about 3.5 | Black Precipitate Solution Yellow-Green pH about 4.5 |
| 20 | Methylene Chloride Containing Aluminum Coupon, Stabilized With 2.8 Wt.% 1,1-Dimethoxyethane | Light Lavender Precipitate | Solution Dark Gray and Precipitate Present pH 3 | pH about 4.5 |
| 21 | Methylene Chloride Containing Aluminum Coupon, Stabilized with 2.0 Wt.% 1,3-Dioxolane | Yellow Green Precipitate | Yellow Precipitate On Aluminum Coupon Solution Green-Gray pH about 3.5 | White precipitate Solution Yellow pH about 4.5 |
| 22 | Methylene Chloride Containing Aluminum Coupon, Stabilized With 0.8 Wt.% 1,4-Dioxane | Red Precipitate | Orange Precipitate On Aluminum Coupon Solution Colorless pH about 4.0 | Pink-brown Precipitate Solution Colorless pH about 4.5 |

From Table V it will be readily observed that after 4 hours the methylene chloride without the stabilizing composition of this invention had undergone a degradation reaction resulting in a dark orange coloration, evolvement of hydrogen chloride gas and complete loss of utility of the solvent. Examples 18 to 22 inclusive of amine, N-methyl pyrrole, butylene oxide, propylene oxide, methyl acetate, acetone, tertiary amylenes, and methyl alcohol are each present in the range of 0.002 to 1.0 percent by weight.

* * * * *